US008625233B1

(12) United States Patent
Ji et al.

(10) Patent No.: US 8,625,233 B1
(45) Date of Patent: Jan. 7, 2014

(54) SYSTEM AND METHOD FOR FABRICATING A MAGNETIC RECORDING POLE

(71) Applicant: Western Digital (Fremont), LLC, Fremont, CA (US)

(72) Inventors: Lili Ji, San Ramon, CA (US); Ming Jiang, San Jose, CA (US); Jerome S. Marcelino, Mountain View, CA (US); Shawn M. Tanner, San Jose, CA (US); Dujiang Wan, Fremont, CA (US); Tiffany Yun Wen Jiang, San Francisco, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/623,839

(22) Filed: Sep. 20, 2012

(51) Int. Cl.
*G11B 5/127* (2006.01)

(52) U.S. Cl.
USPC ..................................................... 360/125.12

(58) Field of Classification Search
USPC ............. 360/125.12, 125.09, 125.03, 125.13, 360/125.16, 125.3, 125.4, 125.06, 125.31 360/125.08, 125.15, 125.1
See application file for complete search history.

(56) References Cited

U.S. PATENT DOCUMENTS

| 6,433,960 | B2* | 8/2002 | Sasaki ...................... 360/123.45 |
| 6,452,742 | B1 | 9/2002 | Crue et al. |
| 6,540,928 | B1 | 4/2003 | Kobrin et al. |
| 6,547,975 | B1 | 4/2003 | Kobrin |
| 6,566,280 | B1 | 5/2003 | Meagley et al. |
| 6,602,794 | B1 | 8/2003 | Kye |
| 6,870,712 | B2 | 3/2005 | Chen et al. |
| 6,972,928 | B2 | 12/2005 | Snyder et al. |
| 6,989,971 | B2 | 1/2006 | Lin et al. |
| 7,024,756 | B2 | 4/2006 | Le et al. |
| 7,108,796 | B2 | 9/2006 | Bergevin et al. |
| 7,120,988 | B2 | 10/2006 | Le et al. |
| 7,132,221 | B2 | 11/2006 | Chen et al. |
| 7,275,306 | B2 | 10/2007 | Allen et al. |
| 7,304,360 | B2* | 12/2007 | Guo et al. .................. 257/422 |
| 7,396,768 | B2 | 7/2008 | Feng et al. |
| 7,444,740 | B1 | 11/2008 | Chung et al. |
| 7,587,811 | B2 | 9/2009 | Balamane et al. |
| 7,679,863 | B2* | 3/2010 | Hashimoto et al. ........ 360/235.7 |
| 7,767,322 | B2* | 8/2010 | Mukai ........................ 428/831.2 |
| 7,862,912 | B2* | 1/2011 | Hellwig et al. ............ 428/828.1 |
| 8,004,794 | B2* | 8/2011 | Zhou et al. ............... 360/125.31 |
| 8,059,366 | B2* | 11/2011 | Takano et al. ............ 360/125.12 |
| 8,413,317 | B1 | 4/2013 | Wan et al. |
| 8,446,692 | B2* | 5/2013 | Zhou et al. ............... 360/125.31 |
| 2005/0058952 | A1 | 3/2005 | Chen et al. |
| 2005/0255336 | A1* | 11/2005 | Mukai ............................ 428/831 |
| 2005/0255337 | A1* | 11/2005 | Mukai ............................ 428/831 |
| 2007/0014146 | A1* | 1/2007 | Guo et al. ...................... 365/158 |
| 2009/0053651 | A1 | 2/2009 | Hatakeyama et al. |
| 2009/0059426 | A1* | 3/2009 | Sasaki et al. ............. 360/125.02 |
| 2009/0173714 | A1* | 7/2009 | Sasaki et al. .................... 216/22 |
| 2009/0226762 | A1* | 9/2009 | Hellwig et al. ................ 428/815 |
| 2010/0078406 | A1 | 4/2010 | Guthrie et al. |
| 2010/0112486 | A1 | 5/2010 | Zhang et al. |
| 2012/0210566 | A1* | 8/2012 | Sasaki et al. .............. 29/603.26 |
| 2012/0229932 | A1* | 9/2012 | Sasaki et al. ............. 360/123.11 |
| 2013/0083432 | A1* | 4/2013 | Le et al. .................... 360/235.4 |

* cited by examiner

Primary Examiner — Allen T Cao

(57) ABSTRACT

Systems and methods for fabricating a microelectric device are provided herein. Particular embodiments provide systems and methods for fabricating a magnetic recording pole for a magnetic recording head, such as an energy assisted magnetic recording (EAMR) head commonly used in a disk storage device. Some embodiments provide for systems and methods of fabricating magnetic recording poles that protect the core of the magnetic recording head during the removal of removal of seed layers.

17 Claims, 14 Drawing Sheets

SYSTEM AND METHOD FOR FABRICATING A MAGNETIC RECORDING POLE

BACKGROUND

Magnetic recording continues trend toward higher recording densities, with magnetic recording densities having already reached 500-600 Gb/in2 using traditional perpendicular magnetic recording technology. Energy assisted magnetic recording (EAMR) is used to further increase magnetic recording densities.

FIGS. 1A and 1B respectively depict top and side views of a portion of a conventional energy assisted magnetic recording (EAMR) transducer 102. For clarity, FIGS. 1A and 1B are not to scale. The illustrated EAMR transducer 102 may be used in writing a recording media (now shown) and typically receives light, or energy, from a conventional laser (not shown) when performing such write processes.

As shown, the EAMR transducer 102 includes a conventional waveguide 110 having cladding 114 and 116 and core 118, a grating 106, a near-field transducer (NFT) 104, a coil 108, and a pole 112. Generally, light from a laser (not shown) is incident on the grating 106, which couples the light to a waveguide 110. Light is guided by the waveguide 110 to the NFT 104 near the air-bearing surface (ABS). The NFT 104, in turn, focuses the light to a magnetic recording medium, such as a disk.

During operation, light from the laser is received by the EAMR transducer 102 through the grating 106, where the waveguide 110 directs light from the grating 106 to the NFT 104. The NFT 104 focuses the light from the waveguide 110 and heats a small region of the magnetic recording medium. The EAMR transducer 102 magnetically writes data to the heated region of the recording media by energizing the pole 112 by way of the coil 108.

When conventionally fabricating a writer pole such as the pole 112, the seed milling process involved during fabrication may be difficult to perform due to the writer pole being built on a bevel. An example of this is shown in FIG. 2, which provides a tilted scanning electron microscope (Tilted-SEM) image 200 of an exemplary pole that is plated on a bevel 202 with height of 500 nm and an angle of 35 degrees. While seed material used during fabrication may be fully removed at the bottom 204 of the bevel 202, full removal of seed material remaining on the slope 206 of the bevel 202 usually requires a seed milling process. Unfortunately, based on such factors as angle of control, mill power, and mill time, the seed milling process performed may result in adverse, over milling of the write pole.

Consider for example where a 30 nm seed layer is used in conventionally fabricating. A seed milling process having a mill time of 240 s at a mill power of 407 W (e.g., including 60 s 10 degree mill and 180 s 75 degree mill) is typically required for full removal of the 30 nm seed layer. While this amount of mill time and mill power would usually result in the removal the 30 nm seed layer, it would also result in a certain amount of over mill at the bottom of the pole. Though the resulting over mill would typically be tolerable for pole fabrication based on an Alumina platform, such results would be intolerable for pole fabrication based on a $SiO_2$ platform. Based on $SiO_2$'s mill rate, which is generally 2-3 faster than that of Alumina, a mill time of 240 s at a mill power of 407 W would likely cause undesirable over milling at bottom of the pole and may even lead to core damage (e.g., damage to the core 118).

BRIEF DESCRIPTION OF SEVERAL VIEWS OF THE DRAWINGS

The present invention is illustrated by way of example, and not limitation, in the figures of the accompanying drawings in which.

DETAILED DESCRIPTION OF THE PREFERRED EMBODIMENTS

In the following description, numerous specific details are set forth, such as examples of specific layer compositions and properties, to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Systems and methods for fabricating a microelectric device are provided herein. In particular, various embodiments provide systems and methods for fabricating a magnetic recording pole (also referred to as a "write pole" or "writer pole") for a magnetic recording head, such as an energy assisted magnetic recording (EAMR) head commonly used in a disk storage device.

For example, systems and methods may fabricate a magnetic recording pole plated on a thin seed layer of CoNiFe (e.g., 10 nm). Such a pole structure, having a thin seed layer, can reduce the seed mill time and better control the amount of over milling when fabricating a magnetic recording pole. This may be particularly useful for magnetic recording poles based SiO2, which tend to have a faster mill rate than Alumina.

Figure 1B:
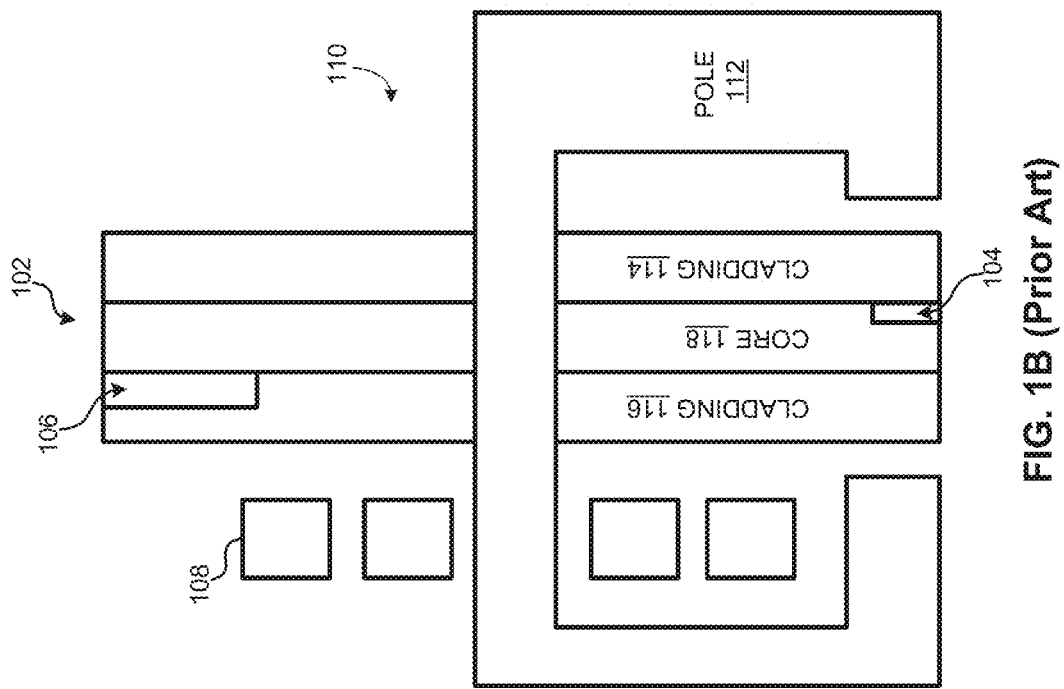
FIGS. 1A and 1B respectively illustrate an air-bearing surface (ABS) view and a side view of a conventional EAMR transducer.
Figure 1A:
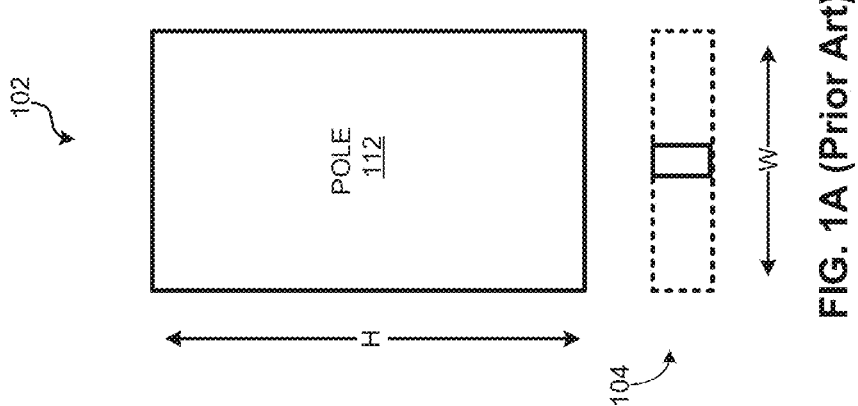
Figure 2:
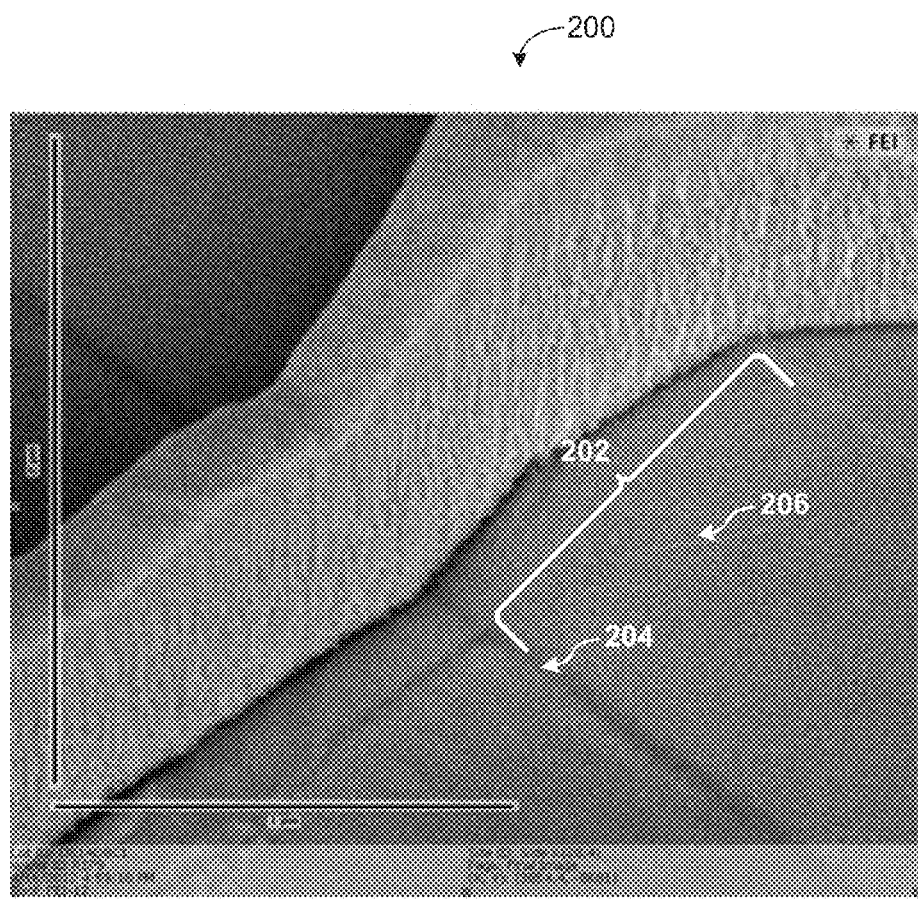
FIG. 2 provides an image of an exemplary conventional pole having a bevel.
Figure 3:
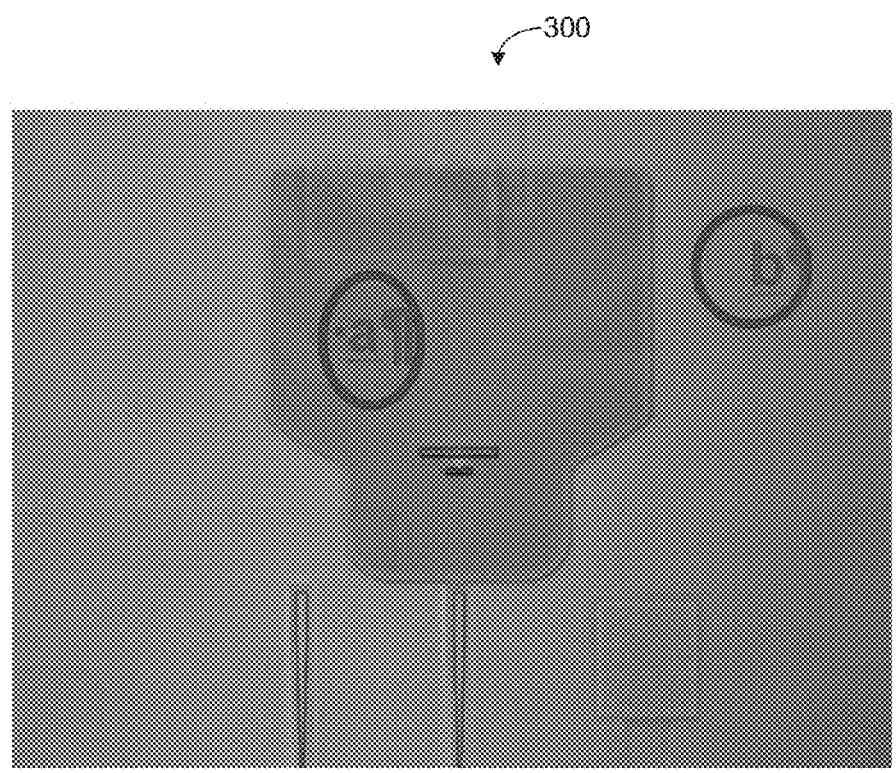
FIG. 3 provides an image of an exemplary wafer having a device area and a field area in accordance with some embodiments.

According to some embodiments, during fabrication of a magnetic recording pole, a wafer may be patterned to have different seed thickness over the field area and the device area (which comprises the pole location). For example, over the field area of the wafer, a seed layer having a thickness of approximately 40 nm may be utilized for plating purposes, while over the device area of the wafer, a seed layer having thickness of approximately 10 nm may be utilized for the writer pole. FIG. 3 provides a microscope image 300 of an exemplary wafer, where the device area (designated as area 'a') has a seed thickness of 10 nm, while the field area (designated as area 'b') has a seed thickness of 40 nm.

Subsequently, while the seed layer over the field area may be removed by wet etch, the seed layer over the device may be removed by milling. With use of a seed layer of 10 nm over the device area, the seed layer over the device area can be milled at a miller power of 100 W, with 125 s of mill time 10 degrees and 340 s of mill time at 75 degrees. Accordingly, various embodiments may permit for less mill time and/or mill power than used during conventional fabrication of magnetic recording pole. Additionally, the reduction in mill time and/or mill power for some embodiments may enable seed layer removal during fabrication of an EAMR $SiO_2$-based device without damage to the core of the device.

According to one embodiment, a method is provided comprising: forming a layer of SiO2 over a substrate layer of a wafer; forming a first seed layer over the layer of SiO2; forming at least one magnetic pole layer over a portion of the first seed layer; and removing a remaining portion of the first seed layer not disposed under the at least one magnetic pole layer. For some embodiments, the substrate layer may comprise NiCr, and 2.3T CoNiFe. For some such embodiments, the NiCr may measure 2 nm or more in thickness, while the 2.3T CoNiFe may measure 10 nm or more in thickness. The resulting magnetic pole layer may comprise a layer of NiFe (e.g., 1.6T NiFe) disposed over a layer of CoNiFe (e.g., 2.3T CoNiFe).

For some embodiments, the formation of the magnetic pole layer may comprise: (a) forming a second seed layer over the first seed layer, wherein the second seed layer comprises a trench exposing at least a portion of the first seed layer through the trench; (b) forming a first patterned resist layer in the trench over the first seed layer, wherein the first patterned resist layer is configured to define at least a portion of the at least one magnetic pole layer in the trench; (c) forming a patterned magnetic layer at least in the trench over the first seed layer such that the patterned magnetic layer is defined by the first patterned resist layer and the patterned magnetic layer is at least disposed in the trench over the first seed layer; (d) removing the patterned resist layer; and (e) removing a first portion of the patterned magnetic layer such that a second portion of the patterned magnetic layer remains disposed in the trench and over the first seed layer, whereby the second portion forms the at least one magnetic pole layer. Depending on the embodiment, the second seed layer may comprise CoNiFe (e.g., 2.3T CoNiFe) and may have a thickness of approximately 30 nm or more.

For various embodiments, forming the second seed layer may comprise: (a) forming a second patterned resist layer over the first seed layer, wherein the second patterned resist layer is configured to define the second seed layer with the trench; (b) forming a patterned non-magnetic material layer over at least the first seed layer such that the patterned non-magnetic layer is defined by the second patterned resist layer; and (c) removing the second patterned resist layer such that the patterned non-magnetic layer remains disposed over the first seed layer, wherein the patterned non-magnetic layer that remains forms the second seed layer with the trench.

FIGS. 4-11 are diagrams illustrating exemplary structures form by a method for fabricating a magnetic recording pole in accordance with some embodiments.

Figure 4:
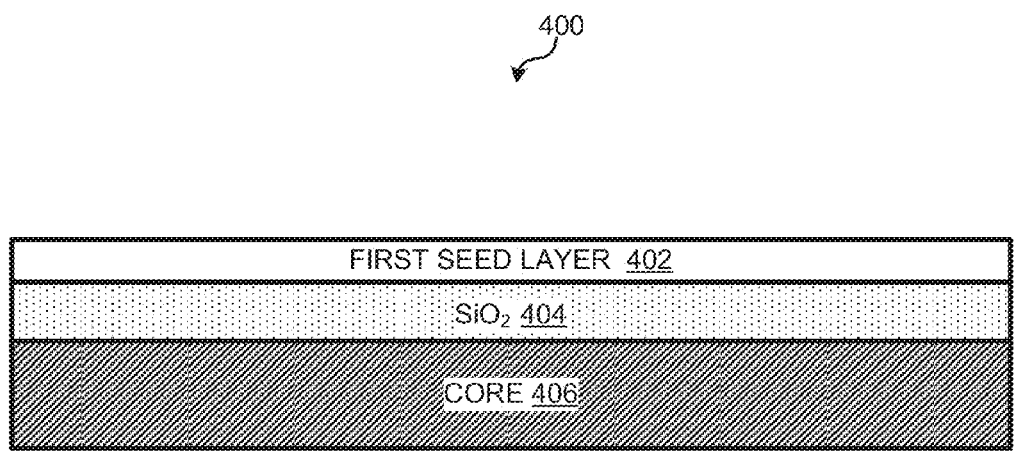
FIGS. 4-11 are diagrams illustrating exemplary structures form by a method for fabricating a magnetic recording pole in accordance with some embodiments.

Starting with reference to FIG. 4, the fabrication of a magnetic recording pole may begin with structure 400 that comprises a core 406, a layer 404 of $SiO_2$ disposed over the core 406, and a first seed layer 402 disposed over the layer 404 of $SiO_2$. For some embodiments, the core 406 may comprise a material known to be suitable in fabricating magnetic recording heads, such as $TaO_x$. For instance, the core 406 may comprise a 120 nm layer of $TaO_x$. The first seed layer 402 may comprise NiCr, CoNiFe or some other suitable seed material. For example, the first seed layer 402 may comprise 2 nm NiCr and 2.3T CoNiFe. Depending on the embodiment, the first seed layer 402 may measure approximately 10 nm or more in thickness.

Figure 5:
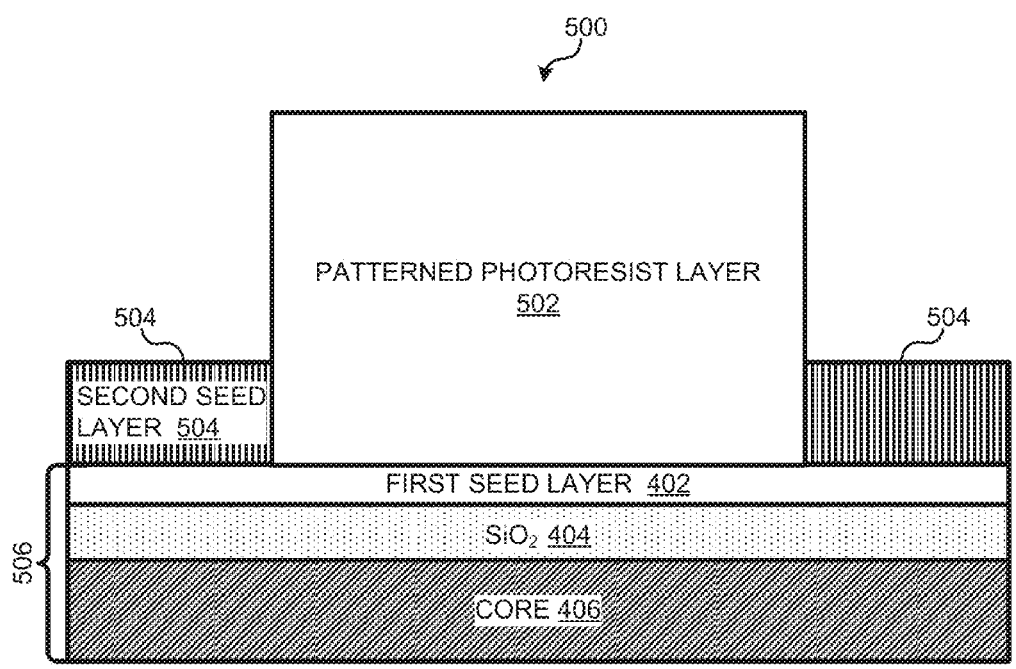

As shown in FIG. 5, structure 400 may subsequently processed to form structure 500, which comprises a structure 506 similar to structure 400 of FIG. 4 (i.e., core 406, a layer of $SiO_2$ disposed over the core 406, and a first seed layer 402 disposed over the layer of $SiO_2$), a patterned photoresist layer 502 disposed over the structure 506, and a second seed layer 504 disposed over the structure 506.

The patterned photoresist layer 502 may comprise material commonly used in forming patterned photoresist layers including, for example, Poly(methyl glutarimide) (PMGI). The formation of the patterned photoresist layer 502 may be in accordance with various methods of photolithography known in the art. Additionally, for some embodiments, the patterned photoresist layer 502 may be replaced by a similarly patterned resist layer formed using a non-photolithographic method known in the art. Similar to the first seed layer 402, the second seed layer 504 may comprise CoNiFe and, in particular, may comprise 2.3T CoNiFe. Depending on the embodiment, the second seed layer 504 may measure approximately 30 nm or more in thickness.

According to some embodiments, the second seed layer 504 may be formed such that it is defined by (e.g., patterned according to) the patterned photoresist layer 502. For example, as shown in FIG. 5, the patterned photoresist layer 502 may be used to define a trench in the second seed layer 504. Subsequently, when the patterned photoresist layer 502 is removed from structure 500 (e.g., by an etch process), structure 600 of FIG. 6 may result, where structure 600 comprises the second seed layer 504 having a trench 602 exposing a portion 604 (e.g., an outward-facing surface) of the first seed layer 402 (which is disposed under the second seed layer 504).

Figure 6:
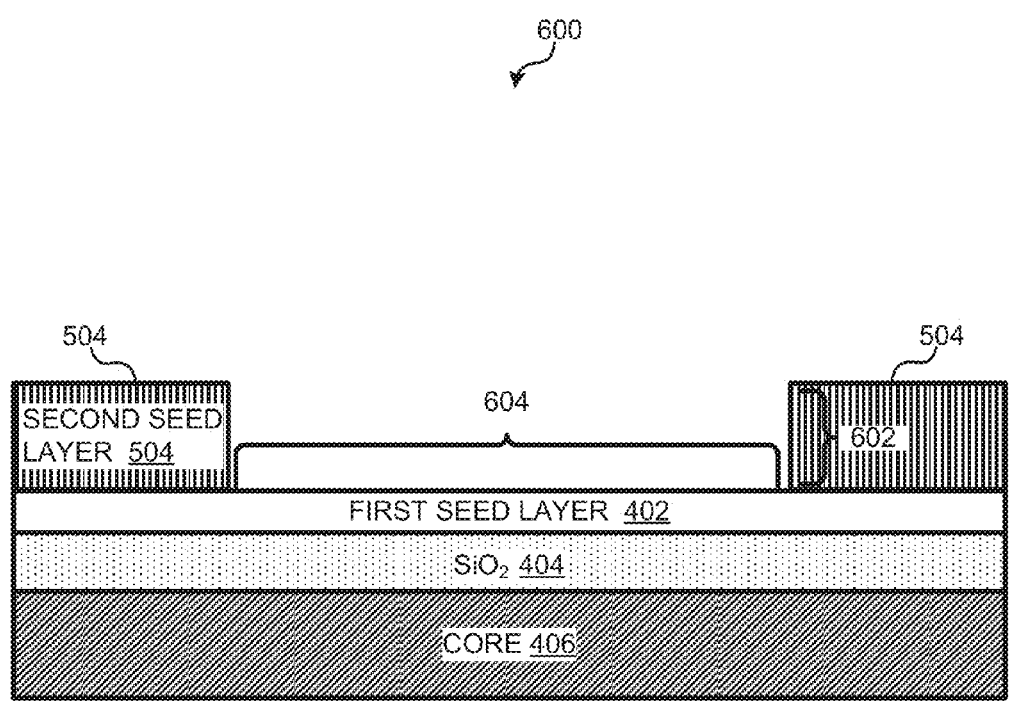
Figure 7:
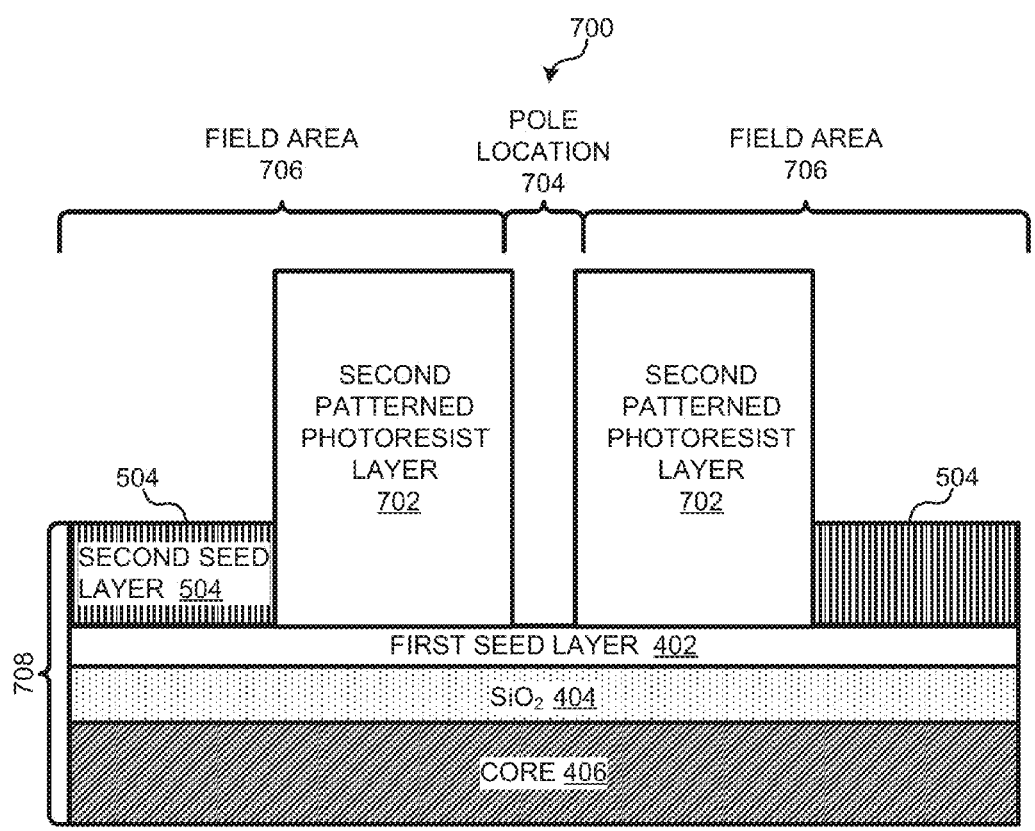

As shown in FIG. 7, structure 600 may be further processed to form structure 700, which comprises a structure 708 similar to structure 600 of FIG. 6, and a second patterned photoresist layer 702 disposed in the trench (e.g., trench 602 of FIG. 6) of the second seed layer 504 and over the portion (e.g., portion 604 of FIG. 6) of the first seed layer 402 exposed through the trench. According to some embodiments, the second patterned photoresist layer 702 may be configured to define the magnetic recording pole to be fabricated at location 704 (also commonly referred to as the "device area"). The area outside of the pole location 704 may be generally regarded as field area 706. The second patterned photoresist layer 702, like the patterned photoresist layer 502 of FIG. 5, may comprise material commonly used in forming patterned photoresist layers, such as Poly(methyl glutarimide) (PMGI).

Figure 8:
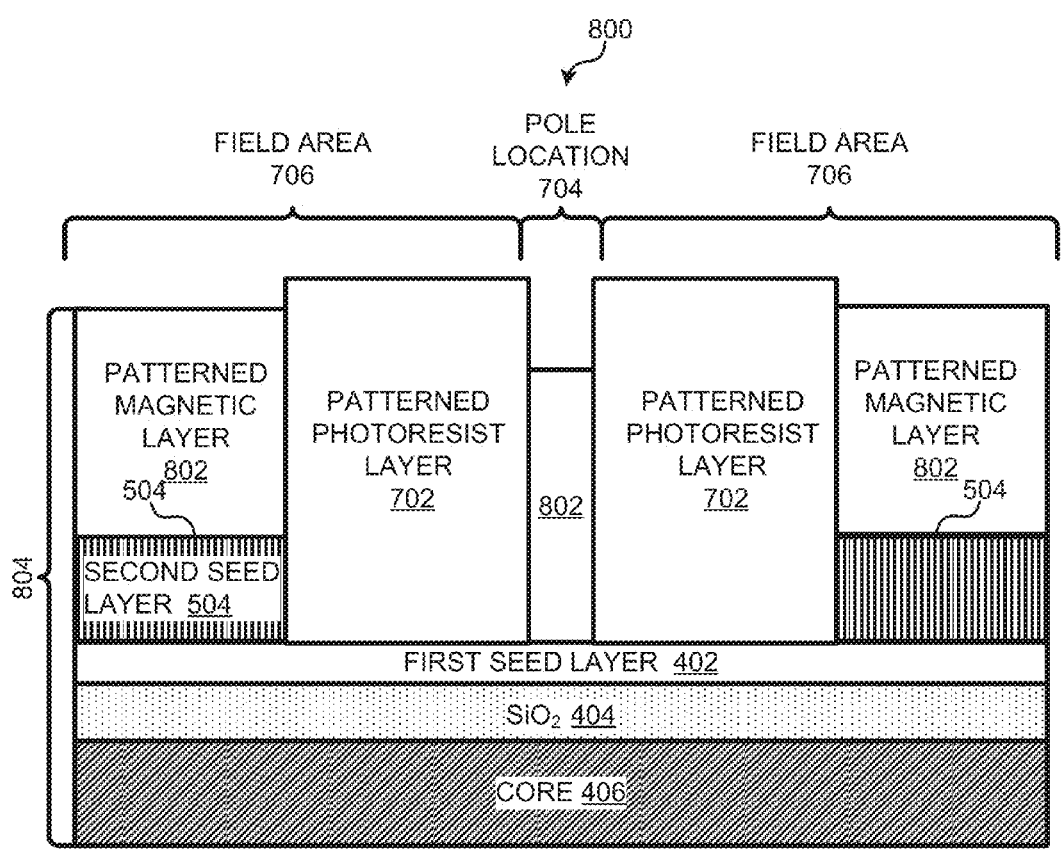

Subsequently, the patterned photoresist layer 702 may be used in forming a patterned magnetic layer that comprises the magnetic recording pole. This is shown in FIG. 8, where structure 700 is further processed to form structure 800. As depicted, structure 800 comprises a structure 804 similar to structure 700 of FIG. 7, and a patterned magnetic layer 702 formed over the second seed layer 504 in the field area 706 and over the first seed layer 402 at pole location 704. In various embodiments, the patterned magnetic layer 702 may be a bi-layer EP2 plating, which possibly comprises a layer of 1.6T NiFe disposed over 2.3T CoNiFe.

Once the second patterned photoresist layer 702 is removed from structure 800 (e.g., by an etch process), the exposed portions of the first seed layer 402 (which are exposed by the photoresist removal) may be milled. In accordance with various embodiments, the presence of the first seed layer 402 in structure 800 may provide protection to the core 406 as the first seed layer 402 is milled. An example of this protection is illustrated in FIG. 9, which depicts an exemplary structure (structure 900) formed from structure 800 after the removal of the second patterned photoresist layer 702 and the milling of the first seed layer 402.

Figure 9:
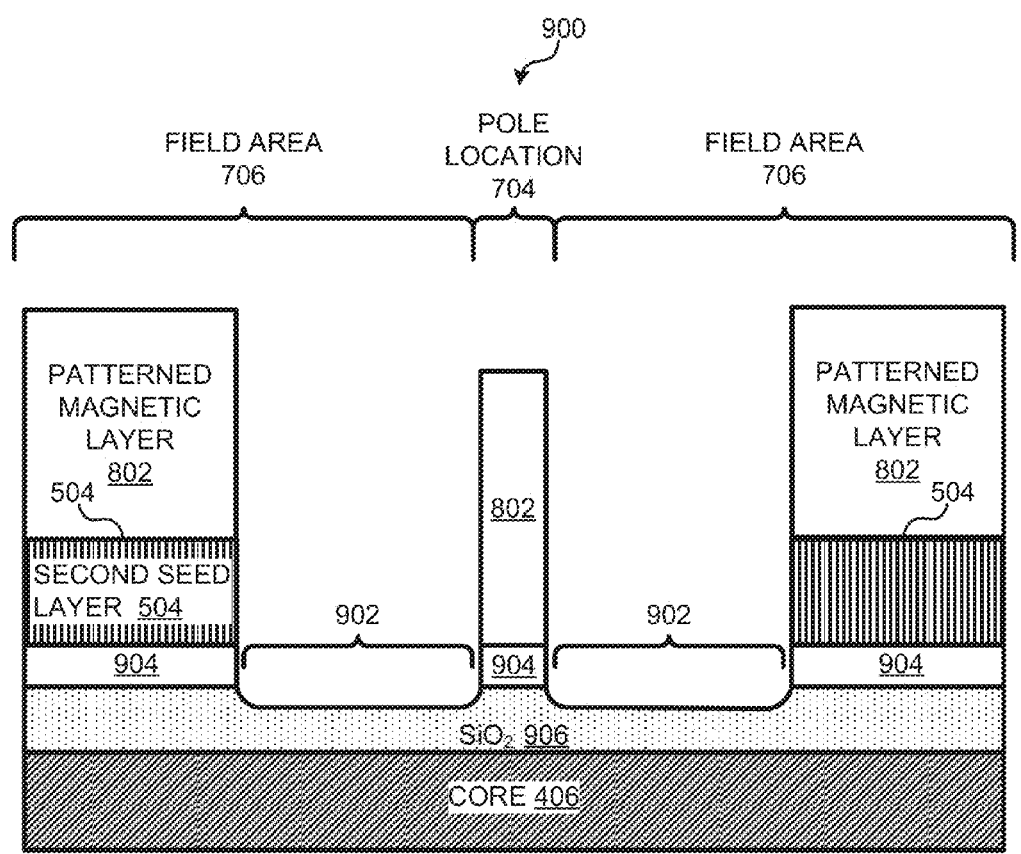

As shown in FIG. 9, structure 900 comprises two trenches over 902 milled portions of the layer 906 of $SiO_2$, and a milled first seed layer 904 having missing portions in comparison to the first seed layer 402 of FIGS. 4-8. In accordance with some embodiments, the over milling of the first seed layer 402 of structure 800 may result in the milled portion of the layer 906 of $SiO_2$. Structure 900 illustrates how despite the over milling of the first seed layer 404 in structure 800, the presence of the first seed layer 402 results in only some of the layer 404 of $SiO_2$ to be removed (rather than all layer 404 being removed), thereby keeping the core 406 protected from the mill process.

Figure 10:
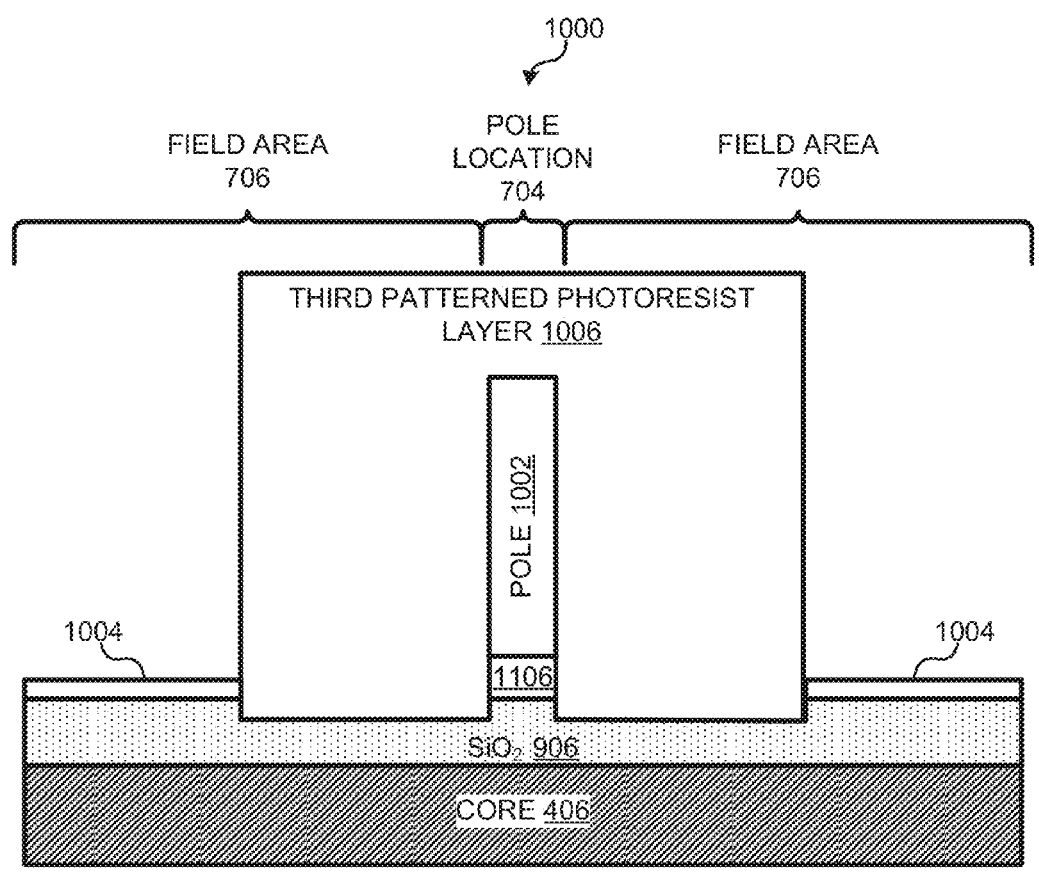

Next, structure 1000 of FIG. 10 may be formed from structure 900 of FIG. 9. Specifically, structure 1000 may be formed by forming a third patterned photoresist layer 1006 that protects portions of the patterned magnetic layer 802 in structure 900 disposed in the trench (e.g., 602) and portions of the milled first seed layer 904 in structure 900 at pole location 704, and subsequently etching those portions of field area 706 of structure 900 not protected by the third patterned photoresist layer 1006. In accordance with some embodiments, etching field area 706 of structure 900 in this manner may result in removal of portions of the patterned magnetic layer 802 in field area 706, removal of the second seed layer 504 in the field area 706, and removal of portions of the milled first seed layer 904 disposed in field area 706. Additionally, in accordance with some embodiments, the removal of portions of the milled first seed layer 904 from structure 900 may result in some portions of the milled first seed layer 904 remaining in field area 706 (shown as etched first seed layer 1004 in FIG. 10). As noted herein, the third patterned photoresist layer 1006 utilized may comprise material commonly used in forming patterned photoresist layers, such as Poly(methyl glutarimide) (PMGI).

As shown in FIG. 10, portions of the patterned magnetic layer 802 in FIG. 9 that are protected by the third patterned resist layer 1006 in FIG. 10 form a magnetic recording pole 1002.

Figure 11:
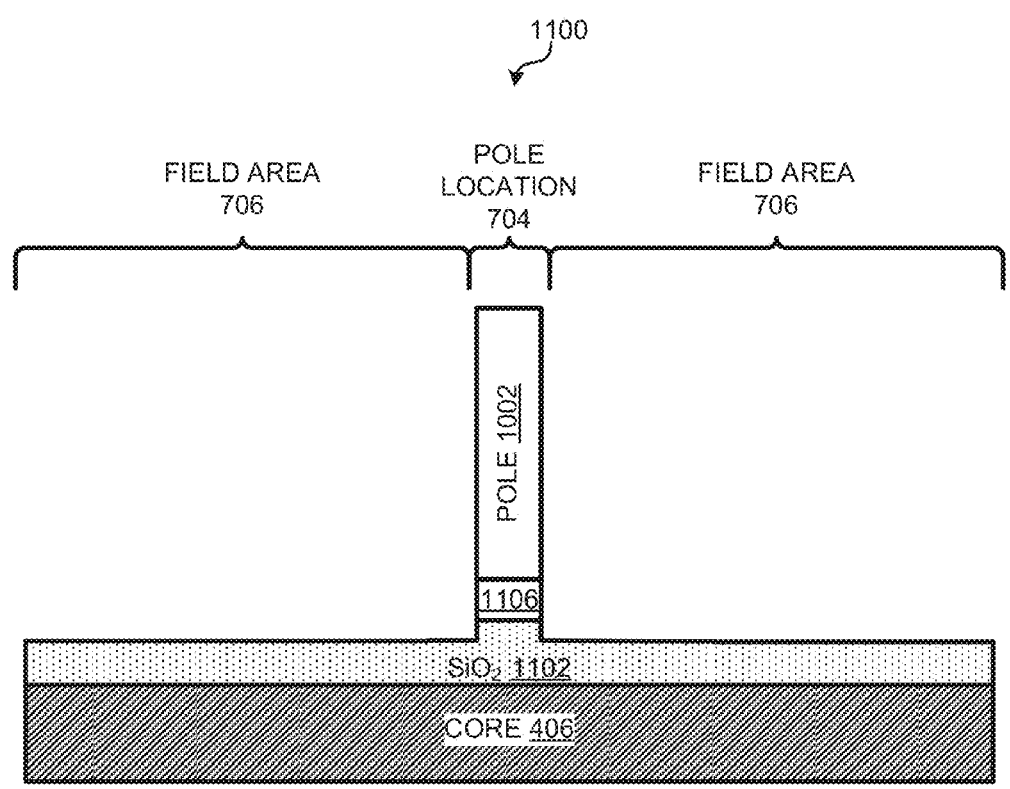

Thereafter, structure 1100 of FIG. 11 may be formed by removing the etched first seed layer 1004 and the third patterned photoresist layer 1006 from structure 1000 of FIG. 10. As shown in FIG. 11, structure 1100 comprises the core 406, a layer 1102 of $SiO_2$, the milled first seed layer 1106, and the magnetic recording pole 1002. In accordance with some embodiments, the removal of the etched first seed layer 1004 from structure 1000 may result in portions of the layer 906 of $SiO_2$ also being removed, thereby resulting in the layer 1102 of $SiO_2$.

Figure 12:
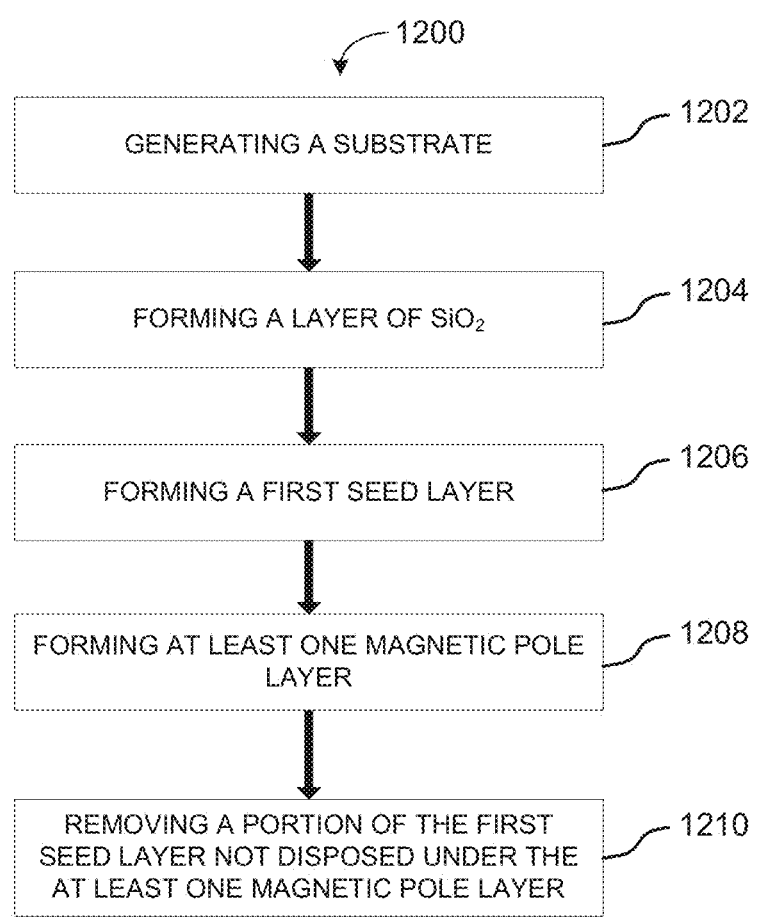
FIG. 12 is a flowchart illustrating an exemplary method for fabricating a magnetic recording pole in accordance with some embodiments.

FIG. 12 is a flowchart 1200 illustrating an exemplary method for fabricating a magnetic recording pole in accordance with some embodiments. As shown, the method may begin with the generation of a substrate at operation 1202, formation of a layer of $SiO_2$ over the substrate at operation 1204, and formation of a first seed layer over the layer of $SiO_2$ at operation 1206. The structure resulting from operations 1202-1206 may be similar to structure 400 of FIG. 4. At operation 1208, at least one magnetic pole layer may be formed over the first seed layer. According to some embodiments, the magnetic pole layer that results may be similar to the pole 1002 illustrated in FIGS. 10 and 11. Eventually, at operation 1210, a portion of the first seed layer (e.g., the first seed layer 1004 illustrated in FIG. 10) not disposed under the at least one magnetic pole layer (e.g., the pole 1002 of FIGS. 10 and 11) may be removed, thereby resulting in a structure that may be similar to structure 1100 illustrated in FIG. 11.

In various embodiments, the method described by FIG. 12 can perform the sequence of operations in a different order, can skip one or more of the operations, or can perform additional operations. Additionally, in some embodiments, one or more of the operations may be performed simultaneously.

Figure 13:
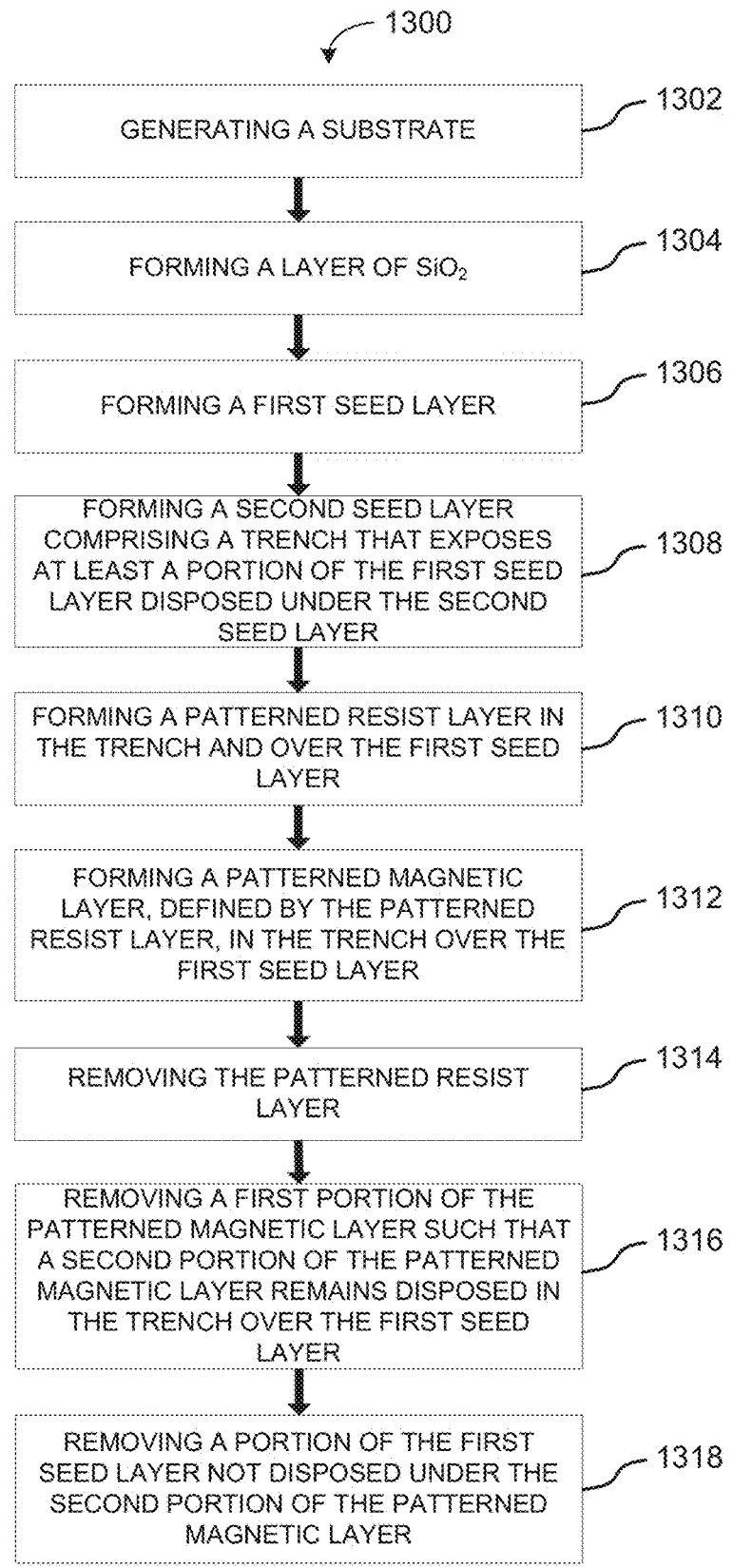
FIG. 13 is a flowchart illustrating an exemplary method for fabricating a magnetic recording pole in accordance with some embodiments.

FIG. 13 is a flowchart illustrating an exemplary method for fabricating a magnetic recording pole in accordance with some embodiments. As shown, the method of FIG. 13 may begin with operations 1302-1306, which similar to operations 1202-1206 of the method of FIG. 12, generate a substrate, form a layer of $SiO_2$ over the substrate, and form a first seed layer over the layer of $SiO_2$.

At operation 1308, a second seed layer is formed over the first seed layer such that the second seed layer comprises a trench exposing at least a portion of the first seed layer, which is disposed under the second seed layer. In according with some embodiments, the second seed layer may be formed by: (a) forming a second patterned resist layer over the first seed layer, wherein the second patterned resist layer is configured to define the second seed layer with the trench; (b) forming a patterned non-magnetic material layer over at least the first seed layer such that the patterned non-magnetic layer is defined by the second patterned resist layer (e.g., structure 500 of FIG. 5); and (c) removing the second patterned resist layer such that the patterned non-magnetic layer remains disposed over the first seed layer, wherein the patterned non-magnetic layer that remains forms the second seed layer with the trench (e.g., structure 600 of FIG. 5).

At operation 1310, a patterned resist layer may be formed in the trench of the second seed layer and over the first seed layer. This may be followed by formation of a patterned magnetic layer in the trench and over the first seed layer at operation 1312. Structure 800 of FIG. 8 illustrates an exemplary structure that may result from performance of operations 1310 and 1312. In accordance with some embodiments, the patterned magnetic layer that results from operation 1312 may be at least partially defined by the patterned resist layer formed during operation 1310. Eventually, at operation 1314, the patterned resist layer of operation 1310 may be removed. A structure similar to structure 900 of FIG. 9 may result from operation 1314.

At operation 1316, a first portion of the patterned magnetic layer may be removed such that a second portion of the patterned magnetic layer remains disposed in the trench and over the first seed layer. The structure that results from operation 1316 may be similar to structure 1000 of FIG. 10. In accordance with some embodiments, the second portion of the patterned magnetic layer that remains in the trench and over the first seed layer forms the magnetic recording pole.

At operation 1318, a portion of the first seed layer that is not disposed under the second portion of the patterned magnetic layer is removed. Structure 1100 of FIG. 11 depicts a structure that may result from operation 1318. With the removal of those portions of the first seed layer not disposed under the at least one magnetic pole layer (and possibly other miscellaneous layers utilized during the method), the structure resulting from operation 1318 may comprise the second portion of the patterned magnetic layer being remaining as the magnetic recording pole.

In various embodiments, the method described by FIG. 13 can perform the sequence of operations in a different order, can skip one or more of the operations, or can perform additional operations. Additionally, in some embodiments, one or more of the operations may be performed simultaneously.

Though the methods of FIGS. 12 and 13 are described in the context of a fabricating a single magnetic recording pole, those skilled in the art will appreciate that other components of a microelectronic device may be fabricated using the method. Additionally, while the methods of FIGS. 12 and 13 are described in the context of particular layers, those skilled in the art will appreciate that for some embodiments, such layers may include multiple sub-layers. Depending on the embodiment, the method of FIG. 12 or FIG. 13 may commence after formation of other portions of a microelectronic device.

Figure 14:
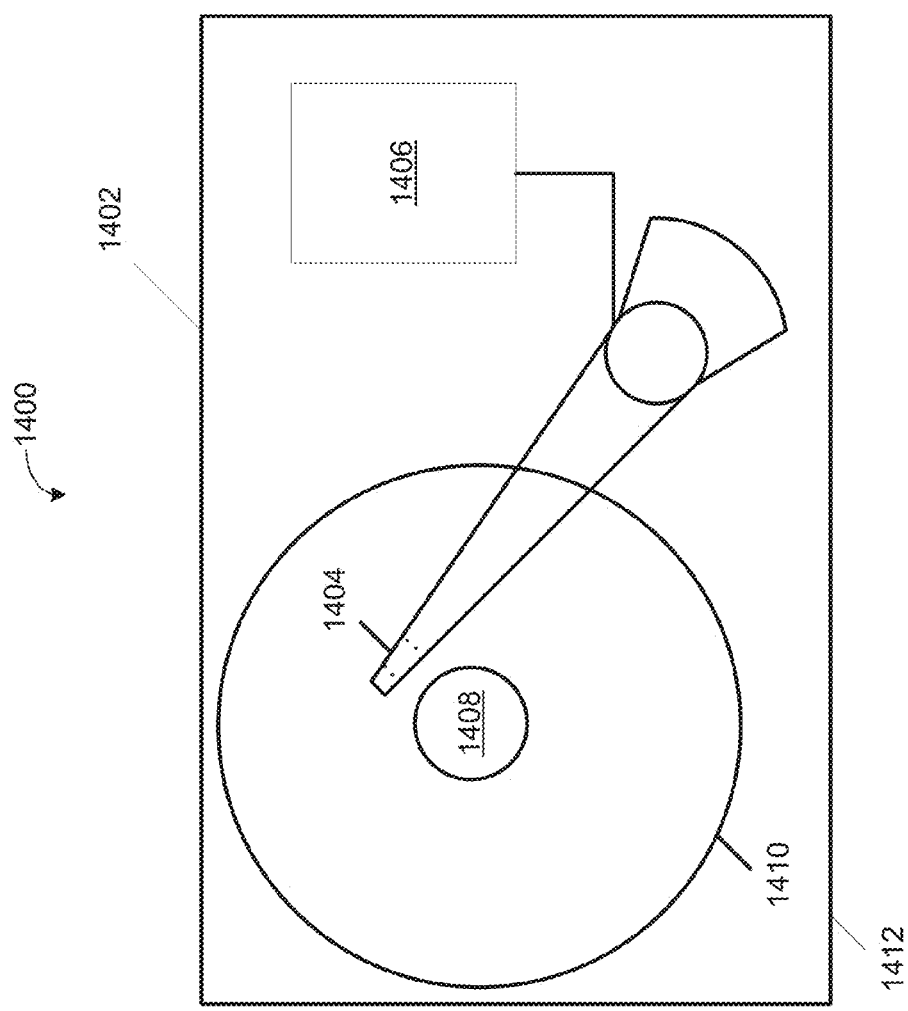
FIG. 14 is a diagram illustrating an exemplary disk drive including a magnetic recording head formed in accordance with some embodiments.

FIG. 14 is a diagram illustrating an exemplary disk drive 1400 including a read-write the head 1404 that can be created in accordance with some embodiments. Disk drive 1400 may include one or more disks to store data. The disks 1410 reside on a spindle assembly 1408 that is mounted to drive housing 1412. Data may be stored along tracks in the magnetic recording layer of one of the disks 1410. The reading and writing of data is accomplished with the head 1404 that has both read and write elements. The write element is used to alter the properties of the perpendicular magnetic recording layer of disk 1410. In some embodiments, the head 1404 may comprising a magnetic recording pole fabricated according to an embodiment described herein. Additionally, for some embodiments, the head 1404 may be an energy assisted magnetic recording (EAMR) head. In various embodiments, the disk drive 1400 may a perpendicular magnetic recording (PMR) drive, and the head 1404 may be suitable for perpendicular magnetic recording (PMR). A spindle motor (not shown) rotates the spindle assembly 1408 and, thereby, disks 1410 to position the head 1404 at a particular location along a desired disk track. The position of the head 1404 relative to the disks 1410 may be controlled by position control circuitry 1406.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A method for fabricating a magnetic recording pole, comprising:
    forming a layer of $SiO_2$ over a substrate layer of a wafer;
    forming a first seed layer over the layer of $SiO_2$;
    forming at least one magnetic pole layer over a portion of the first seed layer, wherein the at least one magnetic pole layer comprises a layer of NiFe disposed over a layer of CoNiFe; and
    removing a remaining portion of the first seed layer not disposed under the at least one magnetic pole layer.

2. The method of claim 1, wherein the remaining portion of the first seed layer is removed by milling.

3. The method of claim 1, wherein the first seed layer comprises NiCr.

4. The method of claim 1, wherein the first seed layer comprises 2.3T CoNiFe.

5. The method of claim 1, wherein the first seed layer has a thickness of approximately 10 nm.

6. A magnetic recording pole, comprising:
    a layer of $SiO_2$ disposed over a substrate layer of a wafer;
    a seed layer disposed over the layer of $SiO_2$; and
    at least one magnetic pole layer disposed over a portion of the seed layer, wherein the at least one magnetic pole layer comprises a layer of NiFe disposed over a layer of CoNiFe.

7. The magnetic recording pole of claim 6, wherein the seed layer comprises NiCr.

8. The magnetic recording pole of claim 6, wherein the seed layer comprises 2.3T CoNiFe.

9. The magnetic recording pole of claim 6, wherein the seed layer has a thickness of approximately 10 nm.

10. A disk drive, comprising:
    a media;
    a slider; and
    a magnetic recorder pole coupled to the slider, the magnetic recorder pole comprising:
        a layer of $SiO_2$ disposed over a substrate layer of a wafer;
        a seed layer disposed over the layer of $SiO_2$; and
        at least one magnetic pole layer disposed over a portion of the seed layer, wherein the at least one magnetic pole layer comprises a layer of NiFe disposed over a layer of CoNiFe.

11. A magnetic recording pole, comprising:
    a layer of $SiO_2$ disposed over a substrate layer of a wafer;
    a seed layer disposed over the layer of $SiO_2$; and
    at least one magnetic pole layer disposed over a portion of the seed layer wherein the at least one magnetic pole layer comprises a layer of 1.6T NiFe disposed over a layer of 2.3T CoNiFe.

12. A method for fabricating a magnetic recording pole, comprising:
    forming a layer of $SiO_2$ over a substrate layer of a wafer;
    forming a first seed layer over the layer of $SiO_2$;
    forming at least one magnetic pole layer over a portion of the first seed layer, wherein the at least one magnetic pole layer comprises a layer of 1.6T NiFe disposed over a layer of 2.3T NiFe; and
    removing a remaining portion of the first seed layer not disposed under the at least one magnetic pole layer.

13. A method for fabricating a magnetic recording pole, comprising:
    forming a layer of $SiO_2$ over a substrate layer of a wafer;
    forming a first seed layer over the layer of $SiO_2$;
    forming at least one magnetic pole layer over a portion of the first seed layer, wherein forming the at least one magnetic pole layer comprises:
        forming a second seed layer over the first seed layer, wherein the second seed layer comprises a trench exposing at least a portion of the first seed layer through the trench,
        forming a first patterned resist layer in the trench over the first seed layer, wherein the first patterned resist layer is configured to define at least a portion of the at least one magnetic pole layer in the trench, forming a patterned magnetic layer at least in the trench over the first seed layer such that the patterned magnetic layer is defined by the first patterned resist layer and the patterned magnetic layer is at least disposed in the trench over the first seed layer, removing the patterned resist layer, and removing a first portion of the patterned magnetic layer such that a second portion of the patterned magnetic layer remains disposed in the trench and over the first seed layer, whereby the second portion forms the at least one magnetic pole layer; and removing a remaining portion of the first seed layer not disposed under the at least one magnetic pole layer.

14. The method of claim 13, wherein the second seed layer comprises CoNiFe.

15. The method of claim 13, wherein the second seed layer comprises 2.3T CoNiFe.

16. The method of claim 13, wherein the second seed layer has a thickness of approximately 30 nm.

17. The method of claim 13, wherein forming the second seed layer with the trench comprises:

forming a second patterned resist layer over the first seed layer, wherein the second patterned resist layer is configured to define the second seed layer with the trench;

forming a patterned non-magnetic material layer over at least the first seed layer such that the patterned non-magnetic layer is defined by the second patterned resist layer; and removing the second patterned resist layer such that the patterned non-magnetic layer remains disposed over the first seed layer, wherein the patterned non-magnetic layer that remains forms the second seed layer with the trench.

\* \* \* \* \*